US007773789B2

(12) United States Patent
Rousson et al.

(10) Patent No.: US 7,773,789 B2
(45) Date of Patent: Aug. 10, 2010

(54) PROBABILISTIC MINIMAL PATH FOR AUTOMATED ESOPHAGUS SEGMENTATION

(75) Inventors: Mikael Rousson, Trenton, NJ (US);
Chenyang Xu, Allentown, NJ (US);
Ying Bai, Baltimore, MD (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1070 days.

(21) Appl. No.: 11/481,992

(22) Filed: Jul. 5, 2006

(65) Prior Publication Data

US 2007/0260135 A1 Nov. 8, 2007

Related U.S. Application Data

(60) Provisional application No. 60/712,571, filed on Aug. 30, 2005.

(51) Int. Cl.
*G06K 9/00* (2006.01)
(52) U.S. Cl. ...................................................... 382/128
(58) Field of Classification Search .......... 382/195–200
See application file for complete search history.

(56) References Cited

U.S. PATENT DOCUMENTS

| 7,079,688 B1* | 7/2006 | Deco et al. ................. 382/190 |
| 2001/0031920 A1* | 10/2001 | Kaufman et al. ............ 600/431 |
| 2005/0123180 A1* | 6/2005 | Luo et al. ................... 382/128 |
| 2005/0169536 A1* | 8/2005 | Accomazzi et al. ......... 382/228 |
| 2005/0180626 A1* | 8/2005 | Moon et al. ................. 382/159 |

OTHER PUBLICATIONS

Fabien Scalzo, Justus Piater; Unsupervised Learning of Visual Feature Hierarchies, IEEE Jun. 2005.*
Yongmei Wang, Physical model-based non-rigid registration incorporating statistical shape information, Medical Image Analysis 2000.*
Henry Schneiderman, Probabilistic Modeling of Local Appearance and Spatial Relationships for Object recognition, CVPR 1998.*
C. Chefd'Hotel, Geometric Methods in Computer Vision and Image Processing: Contributions and Applications. PhD thesis, Ecole Normale Suprieure de Cachan, France, Apr. 2005.
Laurent D. Cohen and Ron Kimmel, Global minimum for active contour models: A minimal path approach, International Journal of Computer Vision, 24(1):57-78, Aug. 1997.
J.A. Sethian, A fast marching level set method for monotonically advancing fronts, In Proceedings of the National Academy of Sciences, vol. 93, pp. 1591-1694, 1996.
T. Kapur, Model-based three-dimensional medical image segmentation, PhD thesis, MIT Artificial Intelligence Lab, 1999.

(Continued)

*Primary Examiner*—Wes Tucker
*Assistant Examiner*—Mark Roz
(74) *Attorney, Agent, or Firm*—Donald B. Paschburg

(57) ABSTRACT

A segmentation of the esophagus from image data by specifying only the two end points is disclosed. Surrounding structures are used as high-level constraints to construct shape and appearance models. Prior shape information is integrated for the segmentation of a new esophagus using a Bayesian formulation. This permits to automatically select the proper models. Given the end points, a shortest path algorithm provides the optimal esophagus according to the Bayesian formulation.

12 Claims, 12 Drawing Sheets

OTHER PUBLICATIONS

H. Lombaert, Y. Sun, L. Grady, and C. Xu, "A multilevel banded graph cuts method for fast image segmentation," Proceedings of ICCV 2005, I, pp. 259-265. IEEE (Bejing, China) Oct. 2005.

P. J. Besl and N. D. McKay, "A method for registration of 3-d shapes," IEEE Trans. Pattern Anal. Mach. Intell. 14(2) pp. 239-256, 1992.

D. Rueckert, L. I. Sonoda, C. Hayes, D. L. G. Hill, M. O. Leach, and D. J. Hawkes, "Non-rigid registration using free-form deformations: Application to breast mr images," IEEE Transactions on Medical Imaging 18(8), pp. 712-721, 1999.

M. Taron, N. Paragios, and M.-P. Jolly, "Border detection on short axis echocardiographic views using a region based ellipse-driven framework," in MICCAI (1), C. Barillot, D. R. Haynor and P. Hellier, eds., Lecture Notes in Computer Science 3216, pp. 443-450. Springer, 2004.

* cited by examiner

PROBABILISTIC MINIMAL PATH FOR AUTOMATED ESOPHAGUS SEGMENTATION

CROSS-REFERENCE TO RELATED APPLICATIONS

This application claims the benefit of U.S. Provisional Application No. 60/712,571 filed Aug. 30, 2005, which is incorporated herein by reference.

BACKGROUND OF THE INVENTION

The present invention relates to segmentation of objects in medical images. More specifically it relates to the segmentation of the esophagus using a Bayesian approach.

Catheter ablation of left atrium (LA) has become standard treatment method for atrial fibrillation, the leading cause of stroke. In recent years, there were several reports of occurrence of atrio-esophageal fistula, a complication of ablating in the posterior wall of the left atrium that usually results in death. Pre-op CT could provide valuable information about the location of esophagus relative to the left atrium that could be used to devise ablation strategy with reduced risk of atrio-esophageal fistula. In the situation where patient is not under general anesthesia and esophagus could move during the ablation procedure, the extracted esophagus shape and its position along anterior/posterior direction could still help to aid the ablation decision of the doctor, arguably less accurate. This limitation could be reduced by applying the methodology of extracting the esophagus directly on interventional CT, because the data is then acquired during the procedure and hence less prone to the problem of esophagus movement.

The segmentation of the esophagus with "standard" techniques is not possible because it is only visible in a few slices. However, a specialist is still able to guess its position with a good confidence. This is possible because he does not rely only on visible parts of the esophagus but also on the context, i.e. the surrounding structures. As shown in FIG. 1, the respective locations of the esophagus (with 101 and 102 as its extreme points), the left atrium and the aorta are well constrained. Including this high-level knowledge can improve dramatically the robustness and reliability of the segmentation. Accordingly improved methods for segmenting the esophagus in medical images are required.

SUMMARY OF THE INVENTION

One aspect of the present invention presents a novel method and system to process image data comprising an esophagus, an aorta and a left atrium and using one or more training images.

In accordance with another aspect of the present invention a method is provided to process an image that includes an esophagus, an aorta and a left atrium using one or more training images, comprising: segmenting the aorta and the left atrium in the image; determining a centerline for the esophagus in the image based on the one or more training images and on the segmentation of the aorta and the left atrium in the image; and generating an outer boundary relative to the centerline of the esophagus.

In accordance with a further aspect of the present invention a first probability is determined of an element of the image to be part of an esophagus centerline relative to the position of the aorta and the left atrium registered to a reference, depending on the centerlines of the esophaguses of one or more training images relative to the registered segmentation of the aorta and the left atrium of the one or more training images registered to the same reference; a second probability is determined of an estimated centerline of the esophagus to have an intensity histogram relative to the intensity histogram of the one or more training images; the first and second probability are combined in a single term; and the single term is optimized.

The first probability can be expressed as $$p_C(x \mid \{C_1, \ldots, C_N\}) = \prod_{i=1}^{N} p(x \mid C_i);$$

and the second probability can be expressed as $$p(I \mid \{C_1, \ldots, C_N\}) = \prod_{i=1}^{N} p(I \mid C_i).$$

The first and second probability are combined as:

$$p_C(x \mid I(x)) = \prod_{i=1}^{N} \underbrace{p(x \mid C_i)}_{\text{location}} \underbrace{p(C_i \mid I(x))}_{\text{appearance}}.$$

In accordance with another aspect of the present invention a method is provided which expresses the combination of the first and the second probability as an energy term $$E(C) = -\log p(C \mid I)$$
$$= -\int_C \underbrace{\log\left(\sum_{i=1}^{N} p(C(s) \mid C_i) p(C_i \mid I(C(s)))\right)}_{g(C(s))} ds;$$

it uses two extreme points of the esophagus; and applies a minimal path algorithm using the two extreme points to minimize the energy term. The energy term can be adjusted for detected air holes in the esophagus.

In accordance with a further aspect of the present invention a method is provided for determining the outer boundary of the esophagus comprising: defining the outer boundary of the esophagus as a series of slices of ellipses; initializing a center of the ellipses on the centerline of the esophagus; expressing a region-based criterion for an ellipse in each slice as an energy term based on intensity likelihoods inside and outside an ellipse; adding a regularization between neighboring ellipses; combining all energy terms of each ellipse in a combined energy expression; and minimizing the combined energy expression.

A system that can process an image that includes an esophagus, an aorta and a left atrium using one or more training images, that includes a processor and application software operable on the processor is also provided in accordance with one aspect of the present invention. The application software can perform all of the methods described herein.

DESCRIPTION OF A PREFERRED EMBODIMENT

Figure 1:
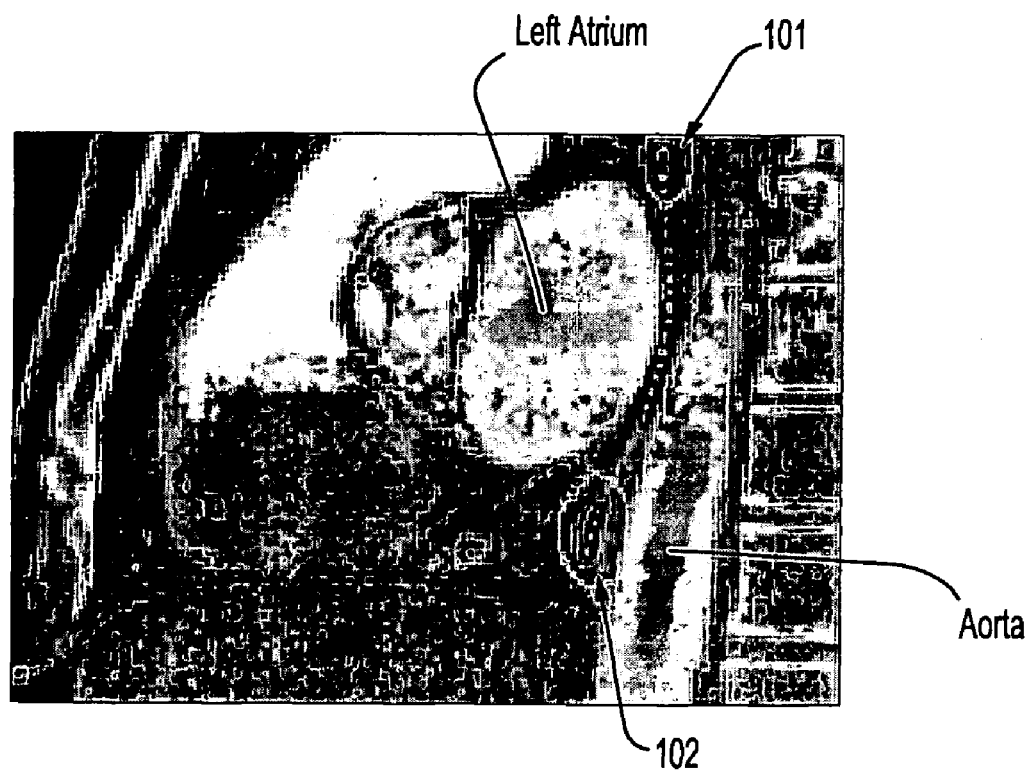
FIG. 1 shows an image highlighting the relative position of esophagus, LA and aorta.

Very few works have considered to model spatial correlation between different structures in, for example, image data. One is the "Distance Model" introduced by Kapur in T. Kapur, "Model-based three-dimensional medical image segmentation." PhD thesis, MIT Artificial Intelligence Lab, 1999. In this reference, the author models the conditional probability of one voxel to belong to a structure, given the Euclidean distance between this voxel and other structures. This model is coupled with a Markov Random Field-based tissue classifier for the segmentation of several structures in MR brain images. This model is adapted to classify brain tissues and the segmentation for structures related to the esophagus requires a more constrained approach. It should not be based on distances between structures but on their relative locations. For this purpose, all the relevant images need to be registered according to chosen anchor or primary structures. This will provide a reference base whereon the location of secondary structures can be learned with respect to the primary ones. In the present invention, the anchor structures are the Left Atrium (LA) and the aorta, while the secondary one is the esophagus. The main reason for this modeling is that the primary structures can be more easily extracted than the secondary ones.

A method will be presented which attempts to mimic the physician approach in establishing the position of the esophagus. The method of segmentation that is an aspect of the present invention comprises three phases: (1) relative location and appearance modeling of the esophagus from a training set in a reference basis defined by the left atrium and the aorta; (2) probabilistic formulation to integrate the models of phase 1 which allows automatic extraction of the esophagus centerline efficiently using a minimal path algorithm; and (3) extension of the center line to extract the esophagus outer surface. A more detailed description of these phases is provided next.

While the esophagus can hardly be seen in CT images, neighbor structures like the aorta and the LA are clearly visible. Moreover, the relative locations of these two structures and the esophagus are highly correlated. Similarly to experts who rely on known visible structures to locate more "hidden" ones, the method which is one aspect of the present invention will learn the relative location of the esophagus with relation to the aorta and the LA. The method will then use this information a priori to segment new images.

The method here presented as one aspect of the present invention will not only learn the spatial information but also the appearance of the esophagus. For this purpose as an illustrative example all three structures for a set of 20 training images are labeled. The segmentation method proposed in H. Lombaert, Y. Sun, L. Grady, and C. Xu. "A multilevel banded graph cuts method for fast image segmentation." in *Proceedings of ICCV* 2005. I. pp. 259-265. IEEE. (Beijing. China). October 2005 is used to extract the LA and the aorta, and an expert was used for manually segmenting the esophagus.

The training images need to be aligned to a common reference. A direct image-based registration is definitely not appropriate since the spatial distribution of the Esophaguses with respect to the surrounding structures would be lost. Therefore it is preferred to register each image relying on the reference structures: the aorta and the LA. Hence, a voxel-wise registration based only on surfaces needs to be estimated. A rigid transformation can first be estimated using, for example, the Iterative Closest Point algorithm as described in P. J. Besl and N. D. McKay. "A method for registration of 3-d shapes," *IEEE Trans. Pattern Anal. Mach. Intell.* 14(2). pp. 239-256. 1992. A dense non-rigid mapping can be obtained using approaches based on the image grid like the Free-Form Deformation model as described in D. Rueckert, L. I. Sonoda, C. Hayes, D. L. G. Hill, M. O. Leach, and D. J. Hawkes, "Non-rigid registration using free-form deformations: Application to breast mr images." *IEEE Transactions on Medical Imaging* 18(8), pp. 712-721. 1999, or by geometric flow estimations as described in C. Chefd'hotel. "*Geometric Methods in Computer Vision and Image Processing: Contributions and Applications.*" PhD thesis, Ecole Normale Suprieure de Cachan, April 2005. Following Chef d'Hotel, part of the problem addressed in the present invention will be solved by representing each surface by a level set function which serves as input of an image-based registration.

Figure 2:
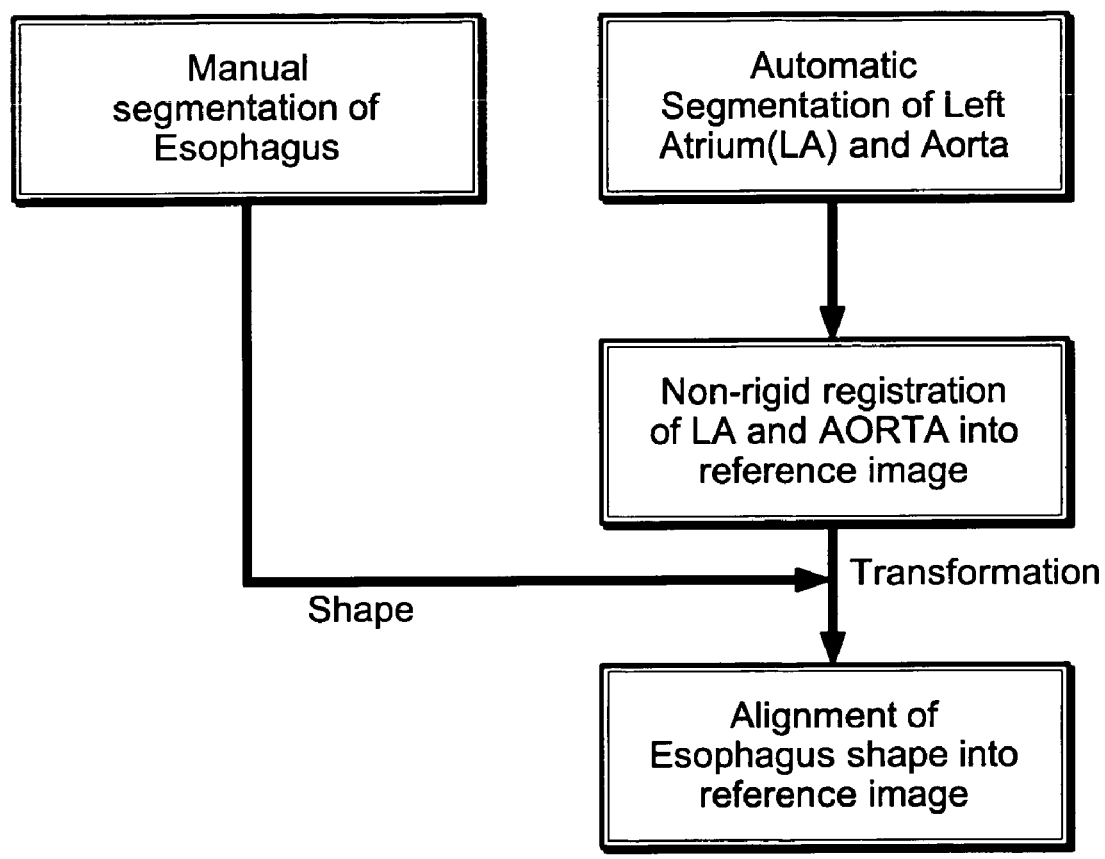
FIG. 2 illustrates a series of steps performed in accordance with one aspect of the present invention.
Figure 3:
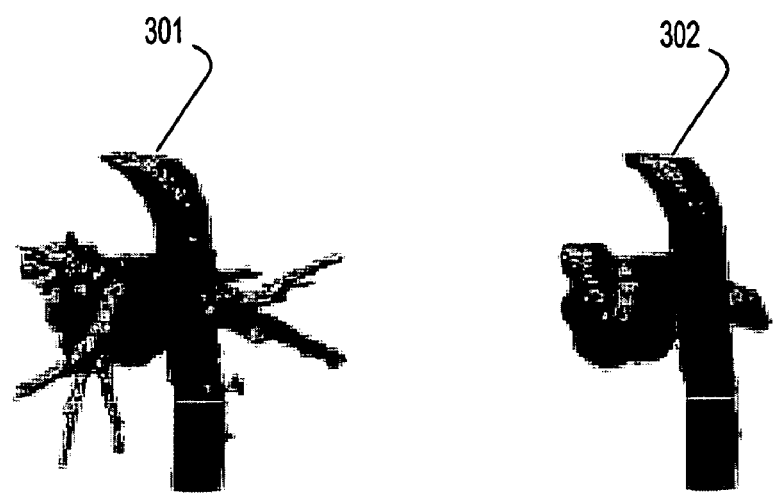
FIG. 3 shows an example of surface simplification.
Figure 4:
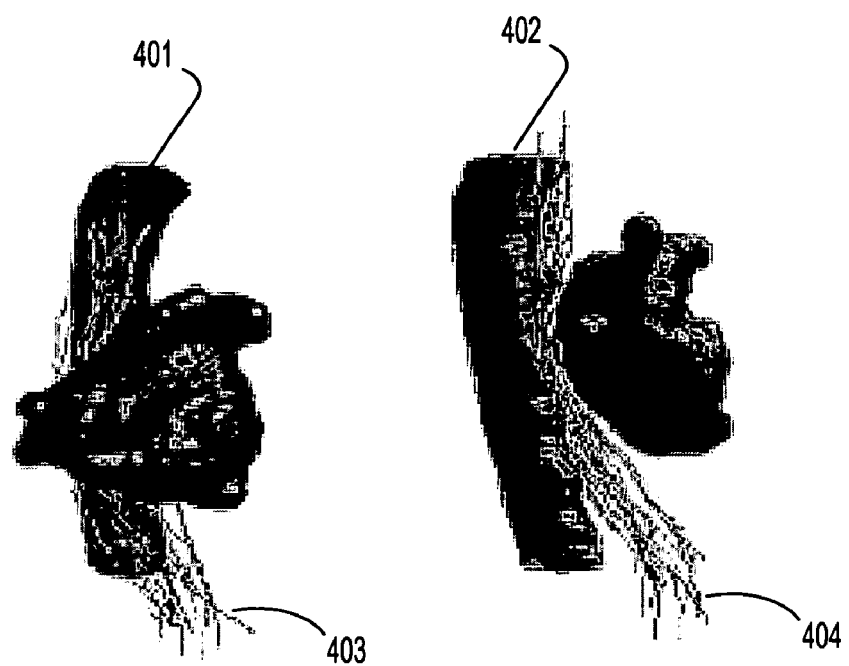
FIG. 4 shows an example of esophaguses registered to a reference aorta and LA.

Complex structures like the LA include parts whose geometry is more variable from one patient to another (thin veins for the LA). Because of this variability, these parts cannot serve as good reference to learn the relative location of another organ. Therefore it is preferred to rely on the global geometry of the reference structures. For this purpose, a simplification algorithm before the registration is used. It consists of a few morphological openings. FIG. 3 shows an example of this process. Morphological openings are used to limit changes of the global structure. In FIG. 3, 302 shows the simplified version of 301. Once simplified, each surface is registered to a selected reference with the algorithm described previously. For each image, a warping will be obtained that maps exactly the LA and the aorta to the ones of the reference image. Applying these warpings to the corresponding esophagus segmentations gives a distribution of esophagus in the reference image. The distribution of the esophagus centerlines obtained on a set of 20 images is shown in FIG. 4. FIG. 4 shows esophaguses registered to the reference aorta and LA. The registration is based on the warping between the two surrounding structures. Relying on the ambient space to register the surfaces, a dense transformation field is obtained in the whole image, which can be applied to the manually segmented esophaguses to provide the distribution as shown in this figure, wherein 401 and 402 provide views from 2 different viewing directions with 403 and 404 representing the centerlines of the registered esophaguses. A flow diagram is presented in FIG. 2 to summarize the steps of the alignment procedure.

Spatial Model

Given a set $\{C_1, \ldots, C_N\}$ of N registered esophagus centerlines, the estimation is desired of the probability of a voxel x to belong to a new esophagus centerline: $p_C(x|\{C_1, \ldots, C_N\})$. Assuming the structures to be independent, the following expression is obtained:

$$p_c(x|\{C_1, \ldots, C_N\}) = \prod_{i=1}^{N} p(x|C_i).$$

Different approximations may be chosen to define $p(x|C_i)$. It can be set to 1 if $x \in C_i$ and 0 otherwise, but a slightly less abrupt preferred choice will be:

$$p(x|C_i) \propto \exp(-D^2(x, C_i)), \quad (1)$$

where $D(x, C_i)$ is the minimum Euclidean distance between x and $C_i$. Other approximations may be considered but this one has the nice advantage that it can be estimated very easily by computing the distance function to $C_i$ using the Fast Marching algorithm as described in J. A. Sethian, "A fast marching level set method for monotonically advancing fronts." In *Proceedings of the National Academy of Sciences*, volume 93, pages 1591-1694, 1996.

Appearance Model

The distribution of the image intensity inside the esophagus can also be learned. Like for the shape model, it is assumed that no correlation between the training samples exists. The a posteriori probability of an intensity value I(x) is given by:

$$p(I|\{C_1, \ldots, C_N\}) = \prod_{i=1}^{N} p(I|C_i).$$

To approximate each distribution $p(I|C_i)$, a kernel density estimation is applied on the histogram of the voxels belonging to the centerline of the esophagus:

$$p(I|C_i) = \frac{1}{\sigma|C_i|} \int_{C_i} K\left(\frac{I - I(x)}{\sigma}\right) dx, \quad (2)$$

where K is a Gaussian kernel defined as $$K(u) = \frac{1}{\sqrt{2\pi}} \exp\left(-\frac{u^2}{2}\right).$$

This model relies only on the histogram and does not incorporate spatial information. In the present case, this relatively simple model is sufficient to capture the appearance of the esophagus since its intensity is more or less homogeneous if the air holes are discarded. However, more elaborate models can be introduced for structures with a more complex appearance. For example, the response of various orientated filters can be used or simply the image gradient. However, one must be aware that with such models, the shortest path algorithm described in the next section may not apply.

Probabilistic Minimal Path—Probabilistic Models Integration

The next step is the integration of the previously described models in the extraction of a new esophagus. Considering a probabilistic formulation, it will become clear that the two models permit to express the probability of a new esophagus. The objective is to find the most probable curve C representing the centerline of the unknown esophagus. Assuming voxels to be independent, this can be expressed as:

$$p(C|I) = \prod_{x \in C} p(x|I(x)).$$

Each factor can be expressed with respect to the training sample using the total probability theorem:

$$\forall x \in \Omega, \ p_C(x|I(x)) = \prod_{i=1}^{N} \underbrace{p(x|C_i)}_{location} \underbrace{p(C_i|I(x))}_{appearance}$$

The first factor is given by equation (1) and the second term can be rewritten with the Bayes rule: $p(C_i|I(x)) \propto p(I(x)|C_i)p(C_i)$. If the training esophaguses are equiprobable, the term $p(C_i)$ is a constant and can be removed. One ends up with a selection of the shape model controlled by the appearance model of equation (2).

Probabilistic Minimal Path—Energy Formulation and Minimal Path Algorithm

Maximizing $p(C|I)$ is equivalent to minimizing its negative logarithm. This allows to the replacement of the product that appears above by a continuous integration along the curve:

$$E(C) = -\log p(C|I) = -\int_C \underbrace{\log\left(\sum_{i=1}^{N} p(C(s)|C_i)p(C_i|I(C(s)))\right)}_{g(S(s))} ds$$

Given the two extreme points of the esophagus $\{x_0, x_1\}$, the optimal solution can be obtained with a minimal path algorithm as described in Laurent D. Cohen and Ron Kimmel, "Global minimum for active contour models: A minimal path approach." *International Journal of Computer Vision*, 24(1): 57-78, August 1997. This approach comprises the following two steps:

1. The value of $E(C(x_0, x))$ is estimated by solving the Eikonal equation $|\nabla \phi(x)| = g(x)$ with the Fast-Marching Algorithm,
2. A back propagation from $x_1$ to $x_0$ gives the optimal path:

$$\frac{\partial C}{\partial t}(x) = \frac{1}{g(x)} \nabla E(x_0, x)$$

Figure 8:
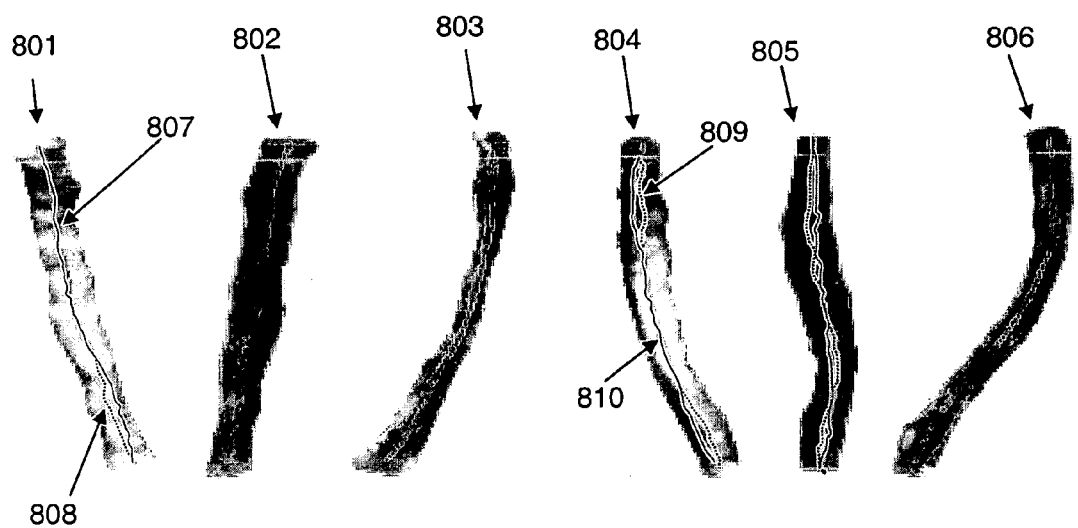
FIG. 8 shows two examples of esophagus centerline extraction in different views.

Results obtained using this minimal path approach are shown in FIG. 8. FIG. 8 shows 3 different views 801, 802 and 803 of one centerline extraction and 3 different views 804, 805 and 806 of another centerline extraction according to one aspect of the present invention. It is clear that the ground truth is very close to the extracted centerline. For clarification the ground truth and the extracted centerlines are highlighted for illustrative purposes in 801, 804 and 805. The solid line 807 is the extracted centerline while the dotted line 808 is the ground truth. Clearly these two lines coincide for most of the centerlines and only differ in small measure over a limited distance. The same applies as an illustrative example in view 804 with lines 809 and 810.

Figure 6:
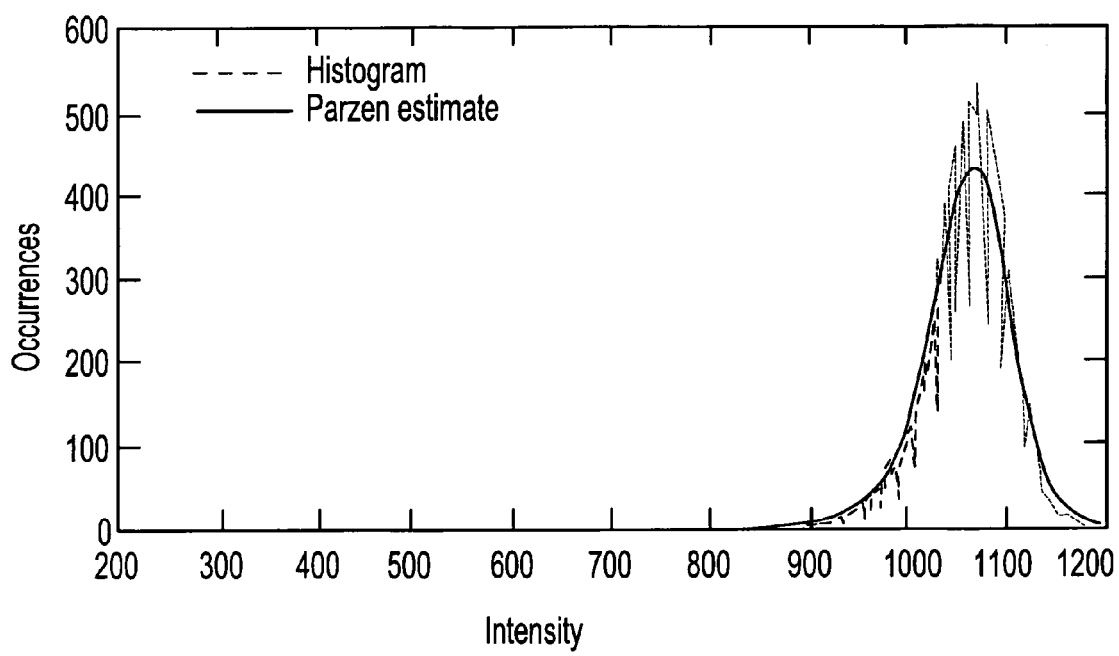
FIG. 6 shows an example of an esophagus histogram with and without smoothing.

So far, the appearance of the esophagus has been modeled by its histograms obtained from training data. These histograms are all very similar to the one shown in FIG. 6. One peak appears for intensities around 1050. This mode corresponds to tissues intensity. As can be seen in FIG. 1 black intensities corresponding to air holes can also be present. These air holes usually represent a very small percentage of the esophagus and cannot be well-described by the histogram. This may result in wrong centerline extractions since the appearance model will try not to include air holes. To resolve this issue a method to detect air holes is presented and followed by modifying the cost function accordingly. Assuming the extracted centerline to be relatively close to the real centerline, air holes should be close to it. Detecting voxels with low intensity (black) in the neighborhood of the centerline, a region growing algorithm to get the complete air holes will be used. This approach is heuristic but it has proven to give a good detection on all the test images. Once the air holes are detected the cost function can be modified with:

$$p_C(x|I(x)) = p(x \in HOLE|I(x)) p(x|I(x), x \in HOLE) + (1-p(x \in HOLE|I(x))) p(x|I(x), x \notin HOLE)$$

Figure 7:
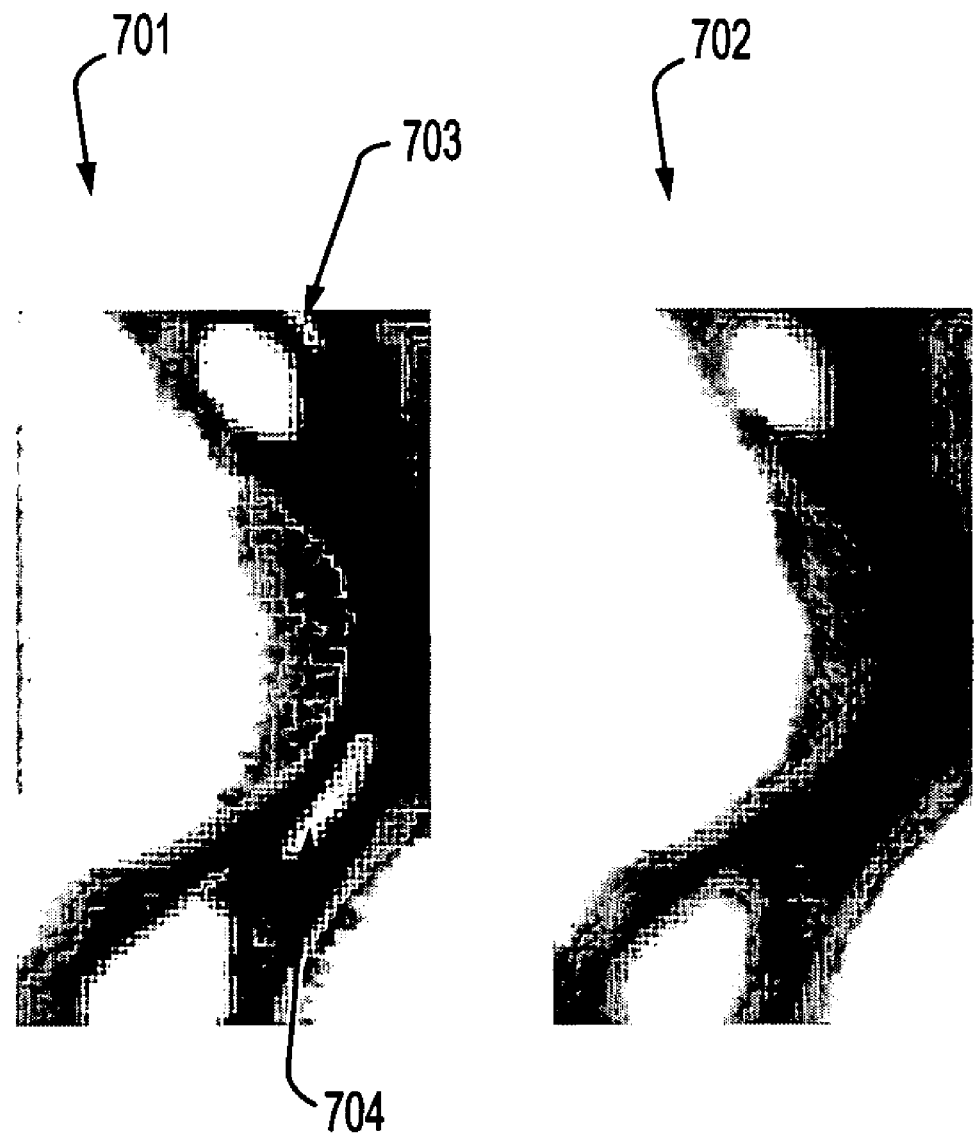
FIG. 7 shows an example of air holes detection and corresponding new cost function.

The term $p(x \in HOLE|I(x))$ is either 1 or 0, depending if x has been classified as air hole or not. $p(x|I(x), x \in HOLE)$ is set to the maximum probability of a non-air hole voxel to be in the centerline (maximum of the histogram). Adding some smoothing then provides the cost function presented in FIG. 7. FIG. 7 shows in image 701 the application of the original cost function with detected air holes 703 and 704. Image 702 shows the application of the modified cost function with has removed the air holes and additional smoothing.

Inner and Outer Boundaries Extraction

Once the centerline is extracted, it becomes possible to segment inner and outer boundaries of the esophagus. Assuming that only air is present inside the esophagus, the inner boundary is obtained in a preferred embodiment from the air hole detection described previously. In a second embodiment one can apply simple region growing which captures the small black regions surrounding the centerline. Only the outer boundary remains to he detected. Given the relatively low intensity discrepancy for this boundary, the extraction needs to be constrained with some prior knowledge. It is of significance that the shape of the esophagus is similar from one patient to another. In particular, its orientation is mainly vertical. This allows applying a robust slice-based approach for the surface extraction. The model that will be applied comprises a set of ellipses defined at each slice that are coupled with a regularization term. The cross-section of the esophagus does not have exactly an elliptic shape but it is still a very good approximation and it makes the extraction very efficient (very few parameters to estimate) and robust. The ellipse parameterization considered in M. Taron, N. Paragios, and M.-P. Jolly, "Border detection on short axis echocardiographic views using a region based ellipse-driven framework," in MICCAI (1), C. Barillot, D. R. Haynor and P. Hellier, eds., Lecture Notes in Computer Science 3216, pp. 443-450. Springer, 2004; will be applied. It should be noted that $\Theta = [x_0, y_0, \alpha, \lambda, \phi]$ represents the optimization space (center, minor and major axes length, and orientation), $R_\Theta(\theta)$ the parametric representation of the ellipse and $F_\Theta(x, y)$ its implicit form. This allows to define a region-based criterion on the ellipse as described in M. Taron, N. Paragios, and M.-P. Jolly, "Border detection on short axis echocardiographic views using a region based ellipse-driven framework.," in MICCAI (1), C. Barillot, D. R. Haynor and P. Hellier, eds., Lecture Notes in Computer Science 3216, pp. 443-450. Springer, 2004, for each slice z:

$$E(\Theta(z)) = \int_{(x,y) \in R_{\Theta(z)}} H(F_{\Theta(z)}) V_{in}(I(x,y)) dx dy + \int_{(x,y) \in R_{\Theta(z)}^c} H(-F_{\Theta(z)}) V_{out}(I(x,y)) dx dy$$

where $V_{in}$ and $V_{out}$ are the intensity log-likelihoods inside and outside the ellipse (obtained from the corresponding histograms), and H is a regularized version of the Heaviside function. Adding a regularization between neighbor ellipses, will lead to a single energy term defined over all the ellipses:

$$E(\Theta) = \int_{z_0}^{z_1} (E(\Theta(z)) + \gamma |\nabla_z \Theta(z)|) dz$$

The parameters $\Theta$ are estimated using a gradient descent. For each slice z, one obtains:

$$\frac{\partial E(\Theta)}{\partial \Theta(z)} = \int_0^{2\pi} \frac{\partial F_{\Theta(z)}(R_{\Theta(z)}(\theta))}{\partial \theta} \frac{1}{|\nabla F_{\Theta(z)}(R_{\Theta(z)}(\theta))|} (V_{out}(R_{\Theta(z)}(\theta)) - V_{in}(R_{\Theta(z)}(\theta)) h(\theta) d\theta + \gamma \Theta_{zz}(z)$$

where $h(\theta) = \alpha \sqrt{(\sin(\theta))^2 + (\lambda \cos(\theta))^2}$.

The optimization starts by setting the center of the ellipse to the corresponding point on the extracted centerline. Minor and major axes are both set to 5 mm. During the minimization, all parameters are updated, even the center. Therefore, the centerline is also modified. This helps to improve the centerline.

Figure 12:
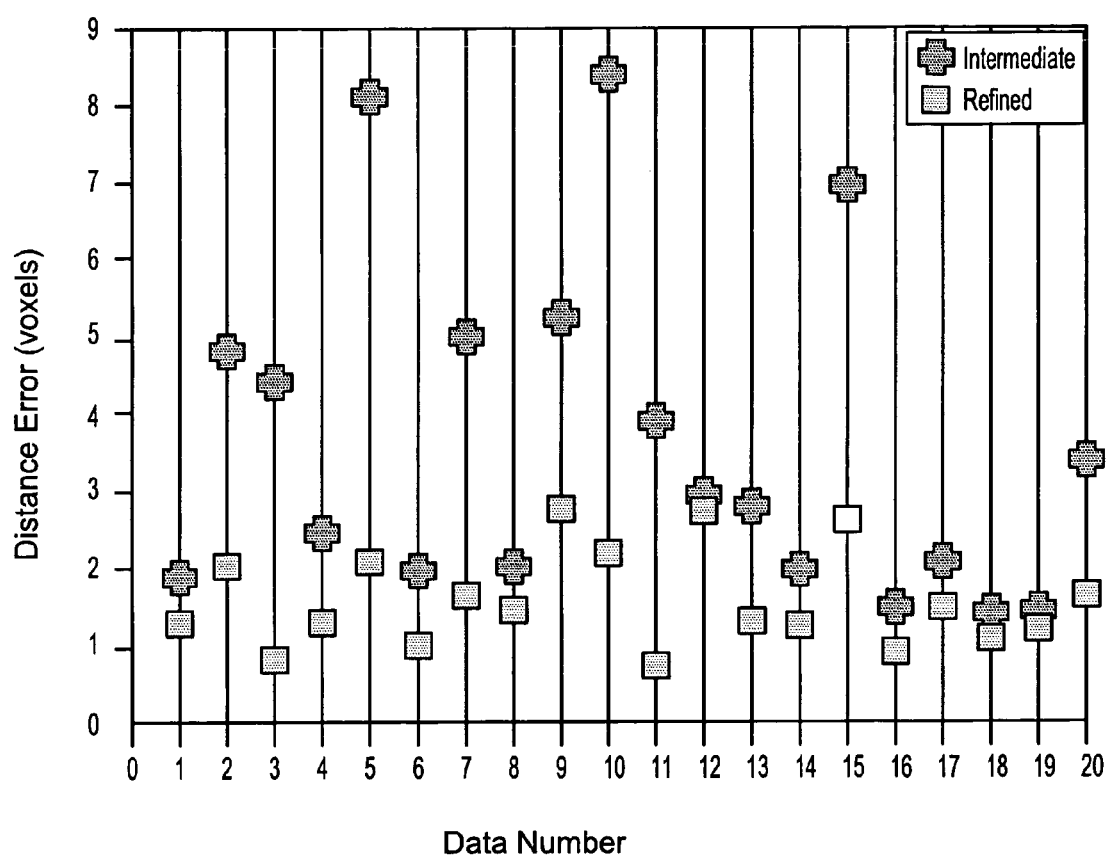
FIG. 12 is a first diagram showing quantitative results of applying methods of the present invention.

In order to validate the approach here described, the esophagus was manually segmented on a data set of twenty images. To measure the performance of the algorithm, a leave-one-out strategy was applied, i.e., the prior models are built with all images but the one to be processed. The only input given to the algorithm is the location of the extreme points of the centerline (two clicks). In FIG. 8, several results obtained for the centerline extraction are shown. These images do not show the effects of air-hole removal, which may be applied as a further refinement. FIG. 12 shows a diagram summarizing the average distance errors obtained for the twenty images (intermediate values). While most results provide very acceptable errors (between two and three voxels), four extractions give errors above ten voxels. However, this is only the first step of the algorithm and these centerlines will be further refined during the surface extraction.

Figure 9:
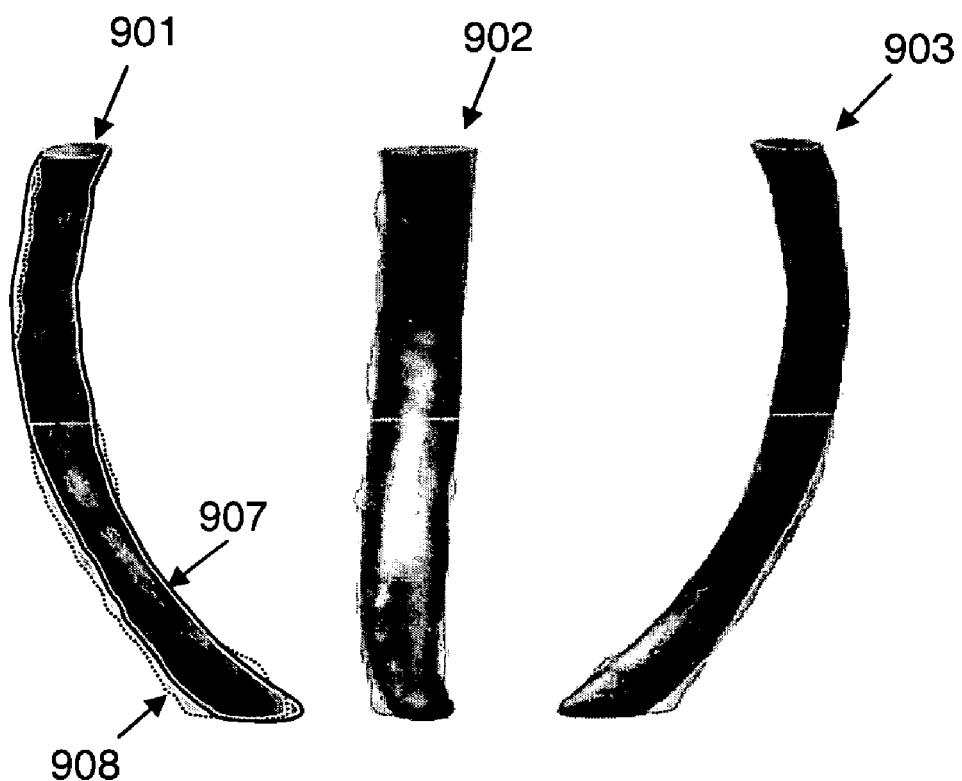
FIG. 9 shows a first example of a surface extraction of an esophagus.
Figure 10:
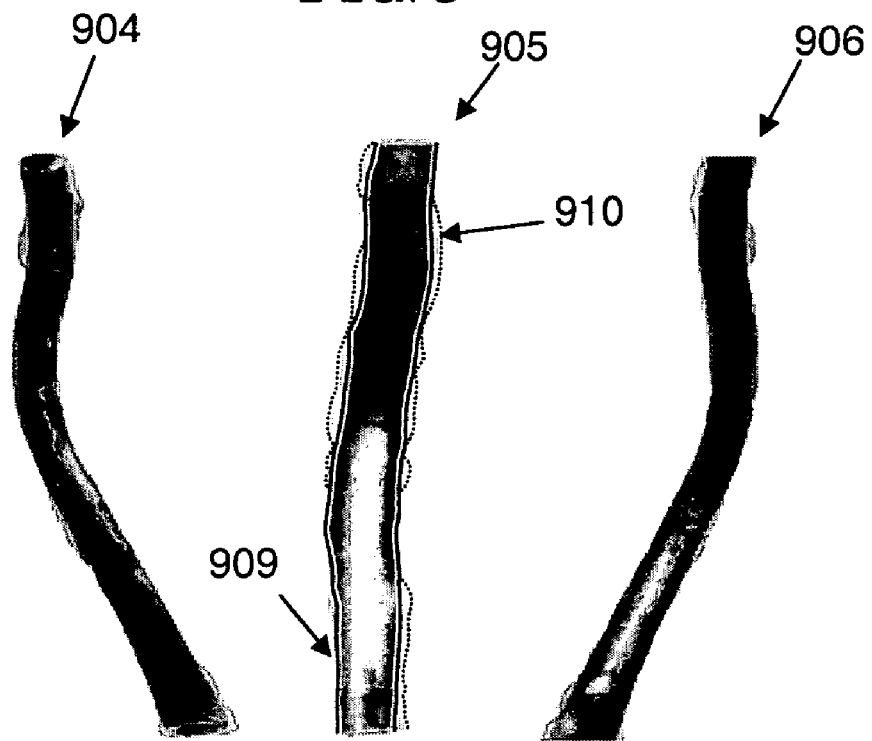
FIG. 10 shows a second example of a surface extraction of an esophagus.
Figure 11:
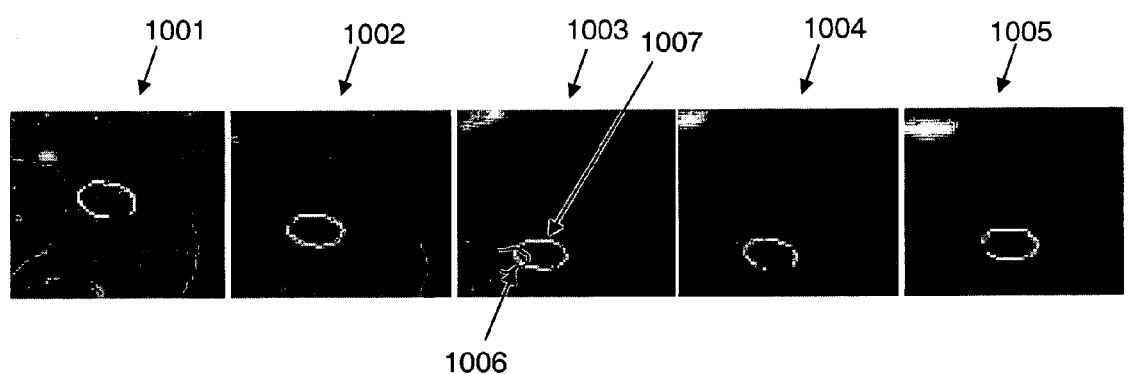
FIG. 11 shows an example with different axial views of a surface extraction of an esophagus.

The surface extraction comprises the ellipse fitting described in the previous section. It uses the previously extracted centerline as initialization. FIG. 9 shows a surface extraction in 3 different views 901, 902 and 903 compared to the ground-truth. For illustrative purposes the difference are highlighted in view 901; the ground truth is highlighted by a dotted line 908 and the extracted surface by solid line 907. When only a solid line is present both the ground truth and the extracted surface are identical. The same highlights are applied for illustrative purposes in FIG. 10 showing three views 904, 905 and 906 of another surface extraction according to one aspect of the present invention. Dotted line 910 shows the ground truth and solid line 909 highlights the extracted surface. It is clear that the extracted surface is very close to the ground truth. Several slices 1001, 1002, 1003, 1004 and 1005 are presented in FIG. 11 for a more accurate appreciation of the results. For illustrative purposes the ground truth and the extracted surface are shown in 1003. Image 1006 provides the ground truth and 1007 the extracted surface.

Figure 13:
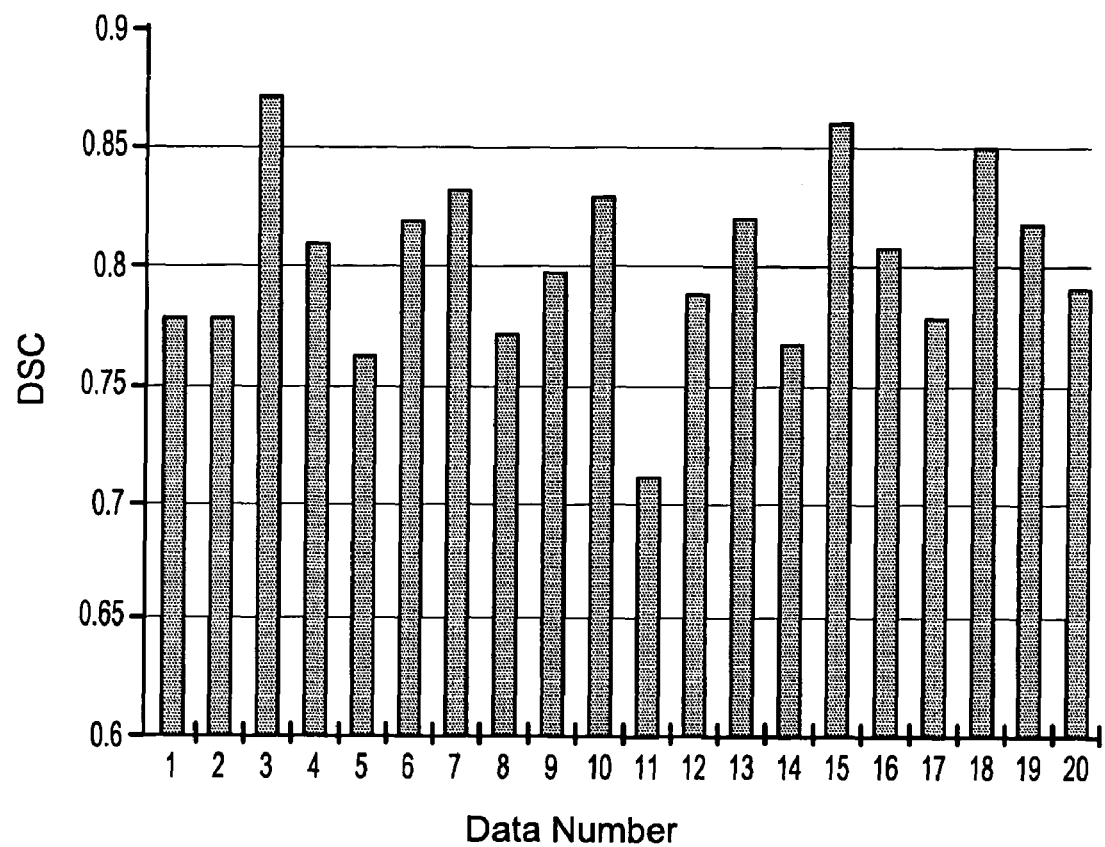
FIG. 13 is a second diagram showing quantitative results of applying methods of the present invention.

These images already show a good overview of the performance of the surface extraction. As a quantitative validation, the Dice similarity coefficient will be computed between the extracted surface and the manual segmentation. It is defined as:

$$DSC = \frac{2|S_{manual} \cap S_{auto}|}{|S_{manual}| + |S_{auto}|},$$

wherein $S_{manual}$ and $S_{auto}$ are the manual and extracted esophagus surfaces and $\|$ stands for the volume. A value greater than 0.7 is usually considered as a good agreement. FIG. 13 shows the values obtained for each image. An average of 0.8025 was obtained, which is a very good score for the present algorithm. One can also measure how much this second step has improved the centerline. FIG. 12 shows the old and new values of the mean distance centerline errors. All values are now below three voxels and most of them are between one and two.

A nearly automatic segmentation of the esophagus by specifying only the two end points has been presented as one aspect of the present invention. By making use of surrounding structures as high-level constraints to construct shape and appearance models, the approach is proven to be robust to noise and missing data. The prior information is integrated for the segmentation of a new esophagus using a Bayesian formulation. This permits to automatically select the proper models. Given the end points, a shortest path algorithm provides the optimal esophagus according to the Bayesian formulation.

The current shape and appearance models introduced herein are illustrative examples and provided according to one aspect of the current invention. More general shape and appearance models can be introduced and are contemplated as another aspect of the present invention. One further example for instance is the segmentation of the spinal cord and using the vertebrae as the anchor structure.

Figure 5:
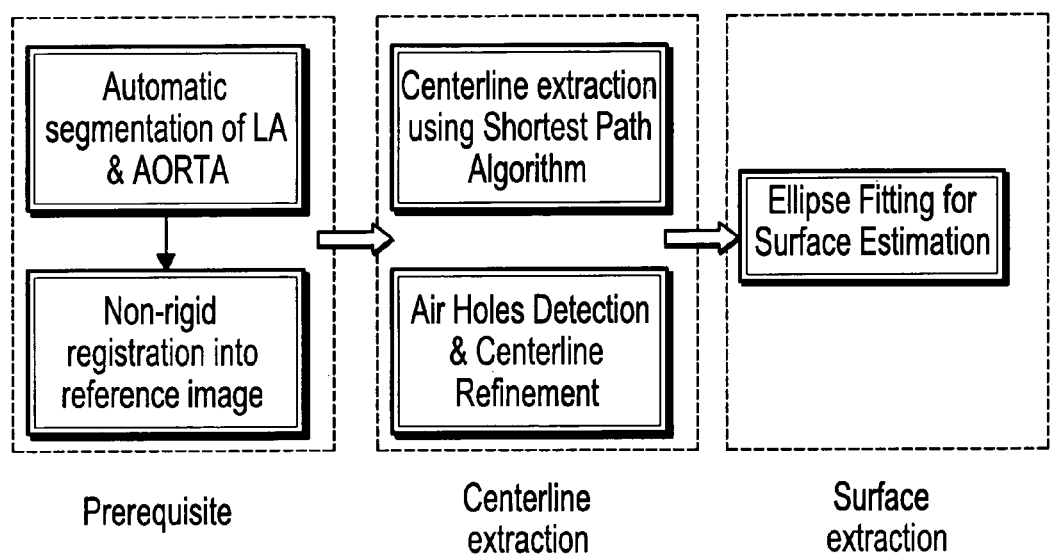
FIG. 5 illustrates a series of steps performed in accordance with one aspect of the present invention.

FIG. 5 provides a flow diagram illustrating the steps according to an aspect of the present invention.

Figure 14:
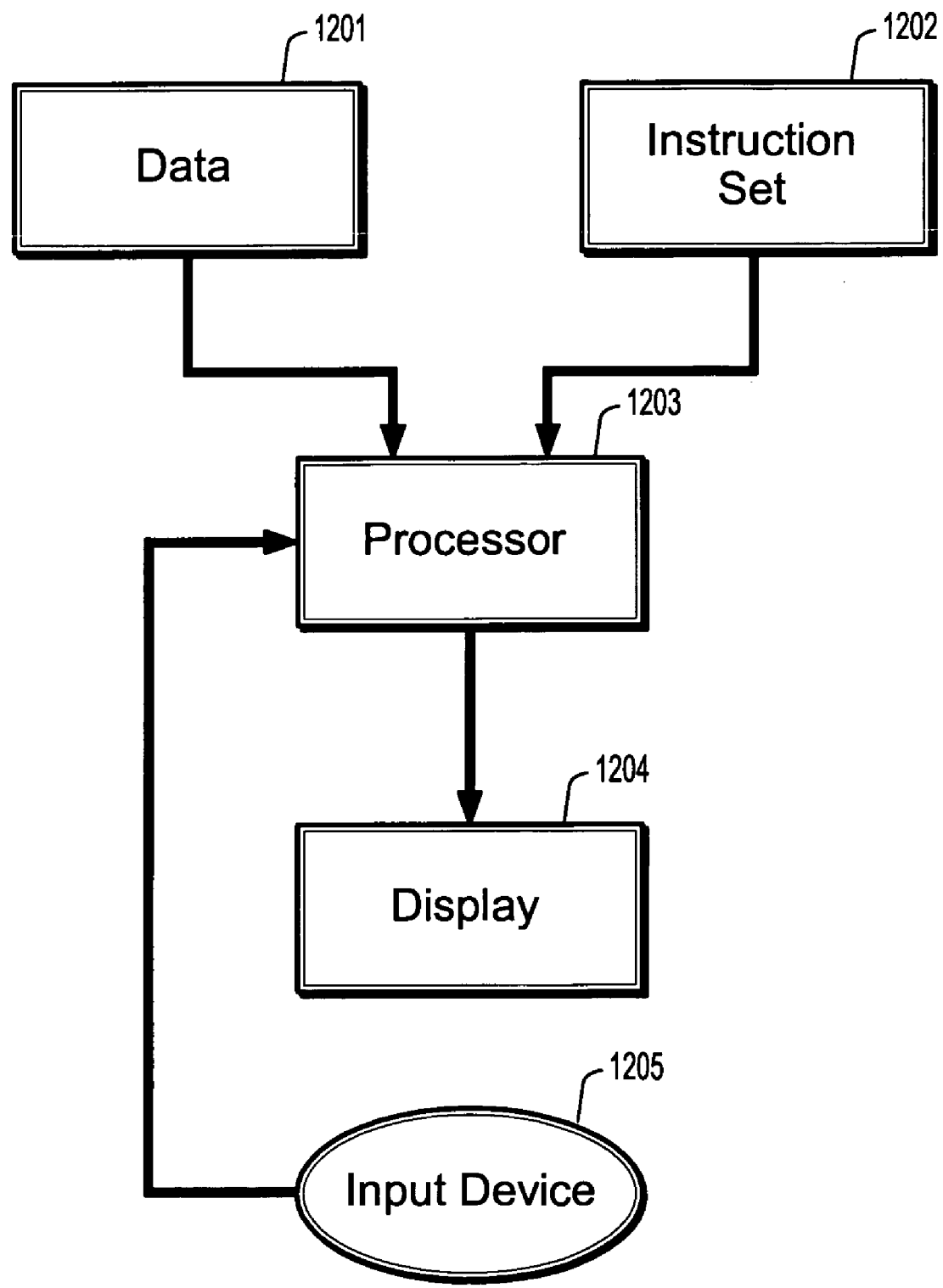
FIG. 14 illustrates a computer system that is used to perform the steps described herein in accordance with another aspect of the present invention.

FIG. 14 illustrates a computer system that can be used in accordance with one aspect of the present invention. The system is provided with data 1201 representing the to be displayed image. It may also include the prior learning data. An instruction set or program 1202 comprising the methods of the present invention is provided and combined with the data in a processor 1203, which can process the instructions of 1202 applied to the data 1201 and show the resulting image on a display 1204. The processor can be dedicated hardware, a GPU, a CPU or any other computing device that can execute the instructions of 1202. An input device 1205 like a mouse, or track-ball or other input device allows a user to initiate the segmentation process. Consequently the system as shown in FIG. 14 provides an interactive system for image segmentation. Of course, any type of computer system can be used, although it is preferred to use a computer system having sufficient processing power. By way of example only, a stand alone PC, a multiprocessor PC, a main frame computer, a parallel processing computer or any other type of computer can be used. In summary, according to one aspect of the present invention a method has been presented which mimics in certain aspects the physician approach in establishing the position of the esophagus. The method of segmentation that is one aspect of the present invention comprises three phases: (1) shape and appearance modeling of the esophagus from a training set in a reference basis defined by the left atrium and the aorta; (2) automatic extraction of the esophagus centerline by integrating each prior knowledge; and (3) extension of the center line to inner and outer boundaries. This method includes:

1. Esophagus Modeling
   (a) Left atrium and aorta are segmented on each training image using the one-click segmentation presented in [5] H. Lombaert, Y. Sun, L. Grady, and C. Xu, "A multilevel banded graph cuts method for fast image segmentation," Proceedings of ICCV 2005, I, pp. 259-265. IEEE (Beijing, China) October 2005;
   (b) The center line of the esophagus is manually segmented on each training image;
   (c) Training images are registered to a common reference based on the left atrium and the aorta; and
   (d) Shape and appearance model are built for the esophagus in the reference basis.

2. Centerline Extraction
   (a) A Bayesian formulation integrating the shape and appearance models is proposed for the extraction of the esophagus centerline.
   (b) The optimal solution is obtained using a shortest path technique.

3. Inner and Outer Boundaries Extraction
   (a) From the estimated centerline, in one embodiment a grow-out strategy is used to find the inner boundary. Detection of airholes can also be applied in a second embodiment.
   (b) If anatomical information about the esophagus thickness is available, it can be incorporated as a constraint to estimate the outer boundary as well. However in a preferred embodiment the outer boundary of the esophagus is determined by a method using the estimated centerline of the esophagus and a series of elliptic slices describing the outer boundary.

Any reference to the term pixel herein shall also be deemed a reference to a voxel.

The following references provide background information generally related to the present invention and are hereby incorporated by reference: [1] C. Chefd'hotel, *Geometric Methods in Computer Vision and Image Processing: Contributions and Applications*. PhD thesis, Ecole Normale Suprieure de Cachan, April 2005; [2] Laurent D. Cohen and Ron Kimmel, Global minimum for active contour models: A minimal path approach, *International Journal of Computer Vision*, 24(1):57-78, August 1997; [3]J. A. Sethian, A fast marching level set method for monotonically advancing fronts, In *Proceedings of the National Academy of Sciences*, volume 93, pages 1591-1694, 1996; [4] T. Kapur, Model-based three-dimensional medical image segmentation, PhD thesis, MIT Artificial Intelligence Lab, 1999; [5] H. Lombaert, Y. Sun, L. Grady, and C. Xu, "A multilevel banded graph cuts method for fast image segmentation," *Proceedings of ICCV* 2005, I, pp. 259-265. IEEE (Beijing, China) October 2005; [6] P. J. Besl and N. D. McKay, "A method for registration of 3-d shapes," *IEEE Trans. Pattern Anal. Mach. Intell.* 14(2) pp. 239-256, 1992; [7] D. Rueckert, L. I. Sonoda, C. Hayes, D. L. G. Hill, M. O. Leach, and D. J. Hawkes, "Non-rigid registration using free-form deformations: Application to breast mr images," *IEEE Transactions on Medical Imaging* 18(8), pp. 712-721, 1999; and [8] M. Taron, N. Paragios, and M.-P. Jolly, "Border detection on short axis echocardiographic views using a region based ellipse-driven framework," in *MICCAI* (1), C. Barillot, D. R. Haynor and P. Hellier, eds., *Lecture Notes in Computer Science* 3216, pp. 443-450. Springer, 2004.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method to process an image that includes a first object, and a second object and a third object, comprising:
    segmenting by a processor of the second object and the third object in the image;
    determining by the processor of a centerline for the first object in the image, wherein the centerline is related to one or more training images which include labels for the the second object and the third object and wherein the centerline is related to the segmentation of the second object and the third object in the image;
    generating an outer boundary relative to the centerline of the first object;
    determining a first probability of an element of the image to be part of a centerline of the first object given the one or more training images wherein each training image is registered to the second and third object in a reference image, wherein the first probability is determined by the processor evaluating an expression $$p_C(x|\{C_1, \ldots, C_N\}) = \prod_{i=1}^{N} p(x|C_i);$$

wherein $p_C(x|\{C_1, \ldots, C_N\})$ represents the first probability, $p(x|C_i)$ represents a conditional probability of an element x of the image being part of a centerline given a training image $C_i$, and $i \in \{1, \ldots, N\}$;
    determining a second probability of an intensity of an element inside the first object given the one or more training images wherein the second probability is determined b the processor evaluating an expression $$p(I|\{C_1, \ldots, C_N\}) = \prod_{i=1}^{N} p(I|C_i).$$

wherein $p(I|\{C_1, \ldots, C_N\})$ represents the second probability, $p(I|C_i)$ represents a conditional probability of an element of the image having an intensity I given a training image $C_i$;
    combining the first and second probability in a single term; and
    optimizing the single term.

2. The method of claim 1, wherein the first and second probability are combined as:

$$p_C(x|I(x)) = \prod_{i=1}^{N} \underbrace{p(x|C_i)}_{\text{location}} \underbrace{p(C_i|I(x))}_{\text{appearance}}.$$

3. The method of claim 2, further comprising:
    expressing the combination of the first and the second probability as an energy term $$E(C) = -\log p(C|I) = -\int_C \log \underbrace{\left( \sum_{i=1}^{N} p(C(s)|C_i)p(C_i|I(C(s))) \right)}_{g(C(s))} ds;$$

wherein C represents a centerline of the first object and s is a variable representing a location on C;
    identifying two extreme points of the first object; and
    applying a minimal path algorithm using the two extreme points to minimize the energy term.

4. The method as claimed in claim 1, wherein the first object is an esophagus, the second object is an aorta and the third object is a left atrium.

5. The method of claim 4, further comprising adjusting an energy tell for detected air holes in the esophagus.

6. The method of claim 1, wherein determining the outer boundary of the first object comprises:
    defining the outer boundary of the first object as a series of slices of ellipses;
    initializing a center of the ellipses on the centerline of the first object;
    expressing a region-based criterion for an ellipse in each slice as an energy term based on intensity likelihoods inside and outside an ellipse;
    adding a regularization term between neighboring ellipses in the energy term;
    combining energy terms of a plurality of ellipses in the series of slices with ellipses in a combined energy expression; and
    minimizing the combined energy expression.

7. A system to process an image from image data, comprising:
    a processor;
    application software operable on the processor to:
    process an image that includes a first object and a second object and a third object, comprising:
        segmenting the second object and the third object in the image;
        determining a centerline for the first object in the image, wherein the centerline is related to one or more training images which include labels for the second object and the third object and wherein the centerline is related to the segmentation of the second object and the third object in the image;
        generating an outer boundary relative to the centerline of the first object;
        determining a first probability of an element of the image to be part of a centerline of the first object given the one or more training images wherein each training image is registered to the second and third object in a reference image, wherein the first probability is determined b the processor evaluating expression $$p_C(x|\{C_1, \ldots, C_N\}) = \prod_{i=1}^{N} p(x|C_i);$$

wherein $p_C(x|\{C_1, \ldots, C_N\})$ represents the first probability, $p(x|C_i)$ represents a conditional probability of an element x of the image being part of a centerline given a training image $C_i$, and i∈ $\{1, \ldots, N\}$;

determining a second probability of an intensity of an element inside the first object given the one or more training images, wherein the second probability is determined by the processor evaluating an expression $$p(I|\{C_1, \ldots, C_N\}) = \prod_{i=1}^{N} p(I|C_i).$$

wherein $p(I|\{C_1, \ldots, C_N\})$ represents the second probability, $p(I|C_i)$ represents a conditional probability of an element of the image having an intensity I given a training image $C_i$;

combining the first and second probability in a single term; and
    optimizing the single term.

8. The system of claim 7, wherein the first and second probability are combined as:

$$p_C(x|I(x)) = \prod_{i=1}^{N} \underbrace{p(x|C_i)}_{location} \underbrace{p(C_i|I(x))}_{appearance}.$$

9. The system of claim 8, further comprising:
expressing the combination of the first and the second probability as an energy term $$E(C) = -\log p(C|I) = -\int_C \log\underbrace{\left(\sum_{i=1}^{N} p(C(s)|C_i)p(C_i|I(C(s)))\right)}_{g(C(s))} ds;$$

wherein C represents a centerline of the first object and s is a variable representing a location on C;
    identifying two extreme points of the first object; and
    applying a minimal path algorithm using the two extreme points to minimize the energy term.

10. The system as claimed in claim 7, wherein the first object is an esophagus, the second object is an aorta and the third object is a left atrium.

11. The system of claim 10, further comprising adjusting an energy term for detected air holes in the esophagus.

12. The system of claim 7, wherein determining the outer boundary of the first object comprises:
    defining the outer boundary of the first object as a series of slices of ellipses;
    initializing a center of the ellipses on the centerline of the first object;
    expressing a region-based criterion for an ellipse in each slice as an energy term based on intensity likelihoods inside and outside an ellipse;
    adding a regularization term between neighboring ellipses in the energy term;
    combining energy terms of a plurality of ellipses in the series of slices with ellipses in a combined energy expression; and
    minimizing the combined energy expression.

* * * * *